(12) United States Patent
Miyoshi et al.

(10) Patent No.: US 8,369,806 B2
(45) Date of Patent: Feb. 5, 2013

(54) RADIO RECEIVER APPARATUS AND RADIO TRANSMITTER APPARATUS

(75) Inventors: Kenichi Miyoshi, Kanagawa (JP); Akihiko Nishio, Kanagawa (JP); Takashi Iwai, Ishikawa (JP); Sadaki Futagi, Ishikawa (JP); Katsuhiko Hiramatsu, Kanagawa (JP); Daichi Imamura, Kanagawa (JP); Takashi Aramaki, Kanagawa (JP)

(73) Assignee: Panasonic Corporation, Osaka (JP)

(*) Notice: Subject to any disclaimer, the term of this patent is extended or adjusted under 35 U.S.C. 154(b) by 331 days.

(21) Appl. No.: 11/908,093

(22) PCT Filed: Mar. 10, 2006

(86) PCT No.: PCT/JP2006/304798
§ 371 (c)(1),
(2), (4) Date: Apr. 24, 2009

(87) PCT Pub. No.: WO2006/095872
PCT Pub. Date: Sep. 14, 2006

(65) Prior Publication Data
US 2009/0239484 A1 Sep. 24, 2009

(30) Foreign Application Priority Data

Mar. 10, 2005 (JP) ................. 2005-066813
Jul. 22, 2005 (JP) ................. 2005-212671
Mar. 9, 2006 (JP) ................. 2006-063972

(51) Int. Cl.
*G06F 3/033* (2006.01)

(52) U.S. Cl. .............. 455/130; 373/260; 373/319

(58) Field of Classification Search .................. 455/130
See application file for complete search history.

(56) References Cited

U.S. PATENT DOCUMENTS
(Continued)

FOREIGN PATENT DOCUMENTS
EP 1 628410 2/2006
JP 3-181246 A 8/1991
(Continued)

OTHER PUBLICATIONS

Notice of the Reasons for Rejection mailed Jan. 19, 2010, issued in corresponding Japanese Patent Application No. 2007-507212, filed Mar. 29, 2007, 3 pages.

(Continued)

*Primary Examiner* — Duc Nguyen
*Assistant Examiner* — Ajibola Akinyemi
(74) *Attorney, Agent, or Firm* — Seed IP Law Group PLLC

(57) ABSTRACT

A radio receiver apparatus that can effectively utilize GI to improve the reception quality. In this apparatus, a data extracting part (104) extracts a data portion of a direct wave from a signal subjected to a radio reception process by a received RF part (102). A GI extracting part (107) extracts, from the signal subjected to the radio reception process by the received RF part (102), GI having a length determined by an extracted GI length deciding part (106). The extracted GI is adjusted by a data position adjusting part (108) such that its rear end coincides with the read end of the extracted data portion. A combining part (109) combines the extracted data portion with the GI the data position of which has been adjusted. The combined signal is then supplied to a frequency axis equalizing part (110), which equalizes the signal distortions of the combined signal on the frequency axis.

2 Claims, 11 Drawing Sheets

U.S. PATENT DOCUMENTS

| | | | |
|---|---|---|---|
| 5,003,534 A * | 3/1991 | Gerhardt et al. | 370/322 |
| 6,529,472 B1 | 3/2003 | Kaneko et al. | |
| 6,834,043 B1 * | 12/2004 | Vook et al. | 370/310 |
| 7,839,940 B2 * | 11/2010 | Borran et al. | 375/260 |
| 2002/0141367 A1 | 10/2002 | Hwang et al. | |
| 2004/0128605 A1 * | 7/2004 | Sibecas et al. | 714/746 |
| 2004/0220986 A1 * | 11/2004 | Pisoni | 708/403 |
| 2005/0052991 A1 * | 3/2005 | Kadous | 370/216 |
| 2006/0045001 A1 * | 3/2006 | Jalali | 370/208 |
| 2009/0052582 A1 * | 2/2009 | Oren | 375/319 |
| 2010/0142638 A1 * | 6/2010 | Jalali et al. | 375/260 |

FOREIGN PATENT DOCUMENTS

| | | |
|---|---|---|
| JP | 3-270533 A | 12/1991 |
| JP | 2000 115115 | 4/2000 |
| JP | 2002369258 A | 12/2002 |
| JP | 2004 349889 | 12/2004 |

OTHER PUBLICATIONS

Falconer, D., et al., "Frequency Domain Equalization for Single-Carrier Broadband Wireless Systems," IEEE Communications Magazine 40(4):58-66, Apr. 2002.

Office Action relating to Japanese Patent Application No. 2007-507212, mailed Apr. 20, 2010, 3 pages.

D. Falconer, et al., "Frequency Domain Equalization for Single -Carrier Broadband Wireless Systems," IEEE Communications Magazine, Apr. 2002, vol. 40, No. 4, pp. 58-66.

N. Toba, et al., "Single Career CDMA ni Okeru Shuhasu Ryoiki Soshin Toka," IEICE Technical Report, Nov. 2004, vol. 104, No. 439, pp. 19-23.

PCT International Search Report dated Jun. 1, 2006.

* cited by examiner

FIG. 16
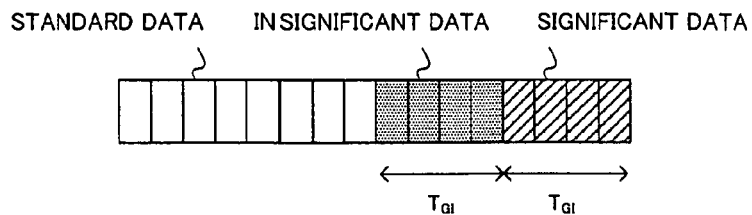
FIG. 17
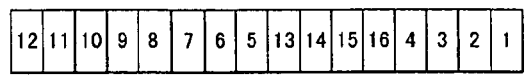
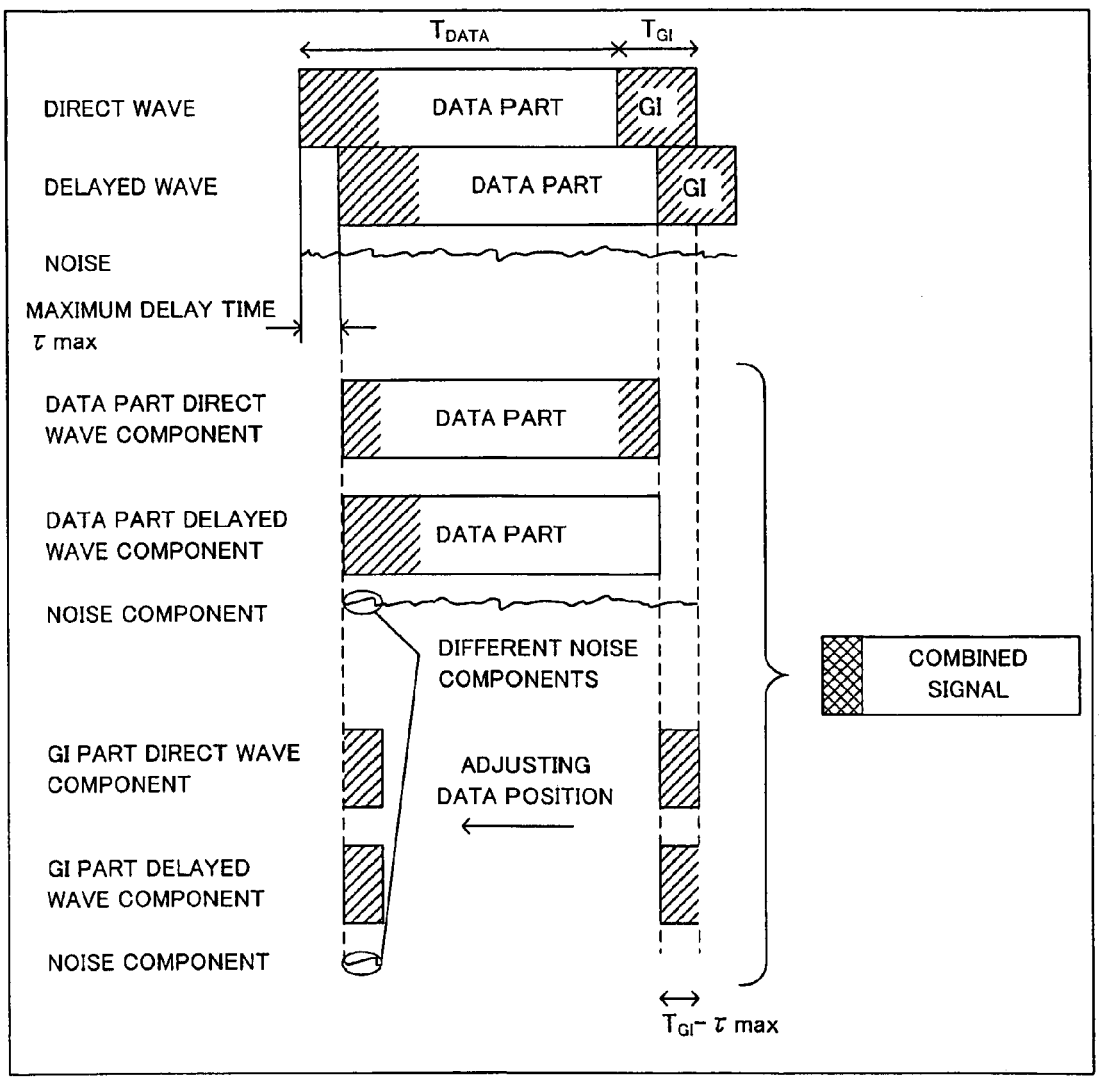
FIG. 18

RADIO RECEIVER APPARATUS AND RADIO TRANSMITTER APPARATUS

TECHNICAL FIELD

The present invention relates to a radio receiving apparatus and a radio transmitting apparatus. More particularly, the present invention relates to a radio receiving apparatus and a radio transmitting apparatus using a single-carrier transmission system.

BACKGROUND ART

In recent years, frequency equalization single-carrier transmission systems have been studied with an eye toward next-generation mobile communication systems. In the frequency equalization single-carrier transmission system, data symbols arranged in the time domain are transmitted by a single carrier. A receiving apparatus corrects signal distortion in the transmission path by equalizing that distortion on the frequency axis. More specifically, the receiving apparatus calculates a channel estimation value for each frequency on the frequency domain, and performs weighting for equalizing channel distortion on a frequency-by-frequency basis. Then the received data is demodulated.

The art disclosed in Patent Document 1 relates to the above frequency equalization single-carrier transmission systems. This art will be briefly described below. As shown in FIG. 1, the transmission system disclosed in Patent Document 1 generates signals in which a predetermined portion of the rear part of transmission data (data part in the drawing) is attached to the head of the data part as a guard interval (hereinafter abbreviated as "GI"). The signals generated are then transmitted from the transmitting apparatus, and signals combining direct waves and delayed waves arrive at the receiving apparatus. At the receiving apparatus, as shown in FIG. 2, a timing synchronization process is performed for the received data, and signals of the length of the data part are extracted from the beginning of the data part of the direct wave. The extracted signals thereby include the direct wave component, the delayed wave component and the noise component from the receiving apparatus, and the extracted signals combine all of these components. Then, the extracted signals are subjected to signal distortion correction process in the frequency domain (frequency domain equalization) and demodulated.

A GI is also called a cyclic prefix ("CP").

Patent Document 1: Japanese Patent Application Laid-Open No. 2004-349889

DISCLOSURE OF THE INVENTION

Problems to be Solved by the Invention

However, according to the art disclosed in Patent Document 1, inserting GIs equals transmitting the same data repeatedly, and so the energy of GI parts not used in decoding is wasted. Generally, GIs are made 10 to 25% of the data length. In other words, nearly 10 to 25% of transmission energy is always wasted.

It is therefore an object of the present invention to provide a radio receiving apparatus and a radio transmitting apparatus that improve received quality through effective use of GI.

Means for Solving the Problem

The radio receiving apparatus of the present invention employs a configuration including: a receiving section that receives a signal in which a cyclic prefix is added to a data part; an extracting section that extracts the cyclic prefix of the signal received by the receiving section; and a combining section that combines the data part of the signal received by the receiving section and the cyclic prefix extracted by the extracting section.

The radio transmitting apparatus of the present invention employs a configuration including: a mapping section that maps first data to a part occupying a cyclic prefix length or shorter from an end of a data part, and second data, which is different from the first data, to a part other than the part where the first data is mapped; an adding section that generates a cyclic prefix having the cyclic prefix length from the data part after the mapping and adds the gene rated cyclic prefix to the end of the data part; and a transmitting section that transmits the data in which the cyclic prefix is added to the data part.

Advantageous Effect of the Invention

According to the present invention, received quality is improved through effective use of cyclic prefixes.

BRIEF DESCRIPTION OF DRAWINGS

FIG. 16 is a transmission format showing a method of data mapping;

FIG. 17 is a transmission format showing a method of data mapping;

FIG. 18 explains a transmission process, according to Embodiment 5 of the present invention;

BEST MODE FOR CARRYING OUT THE INVENTION

Embodiments of the present invention will be described below in detail with reference to the accompanying drawings.

Embodiment 1

Figure 1:
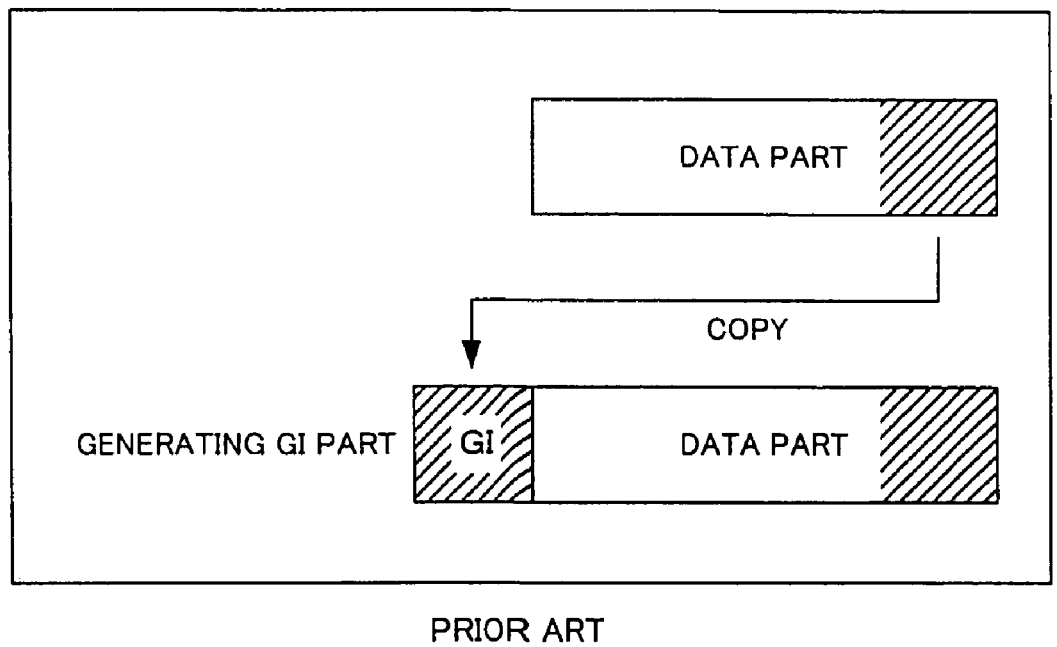
FIG. 1 shows a method of generating GIs.
Figure 2:
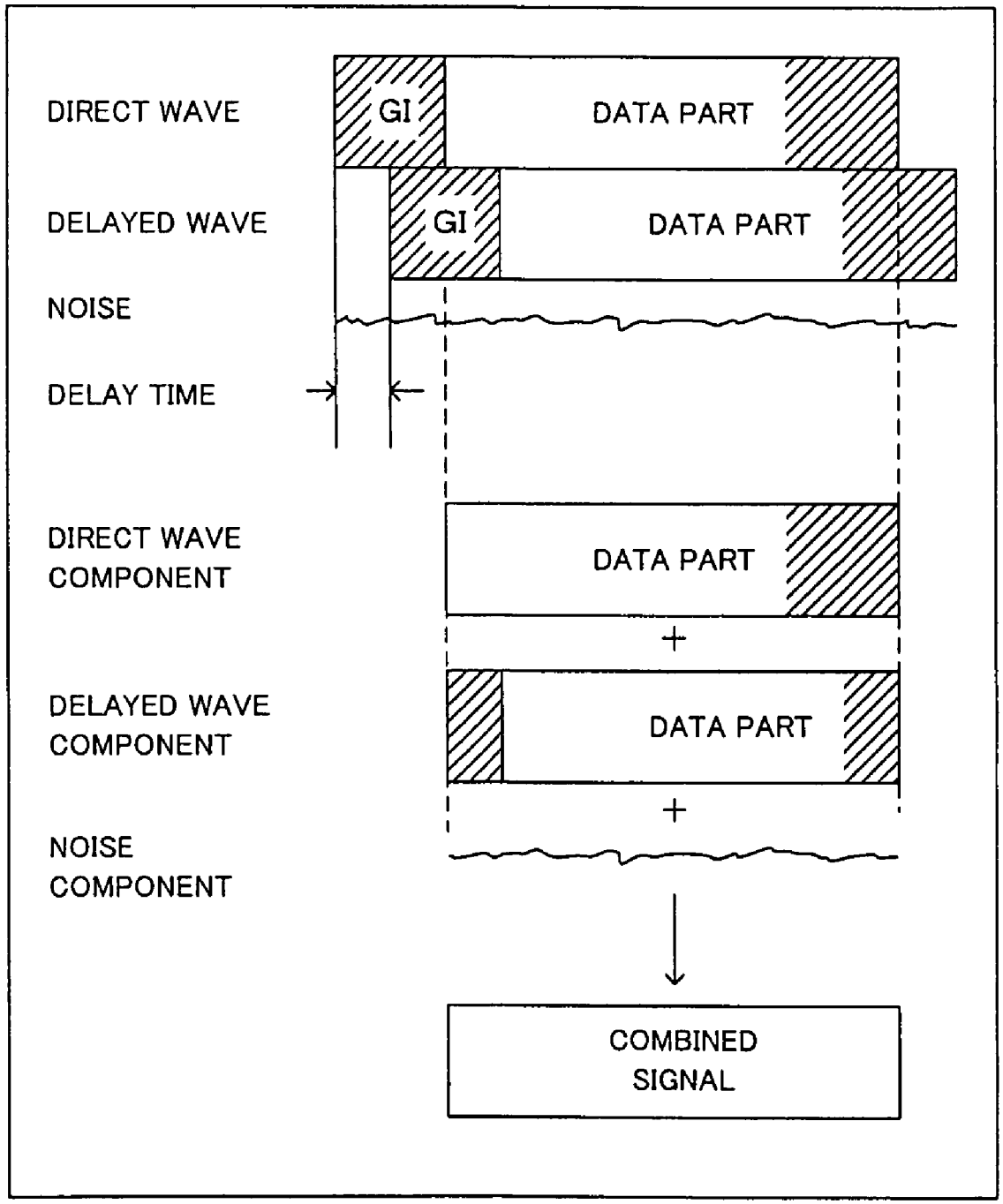
FIG. 2 explains receiving processing in the receiving apparatus disclosed in Patent Document 1.
Figure 3:
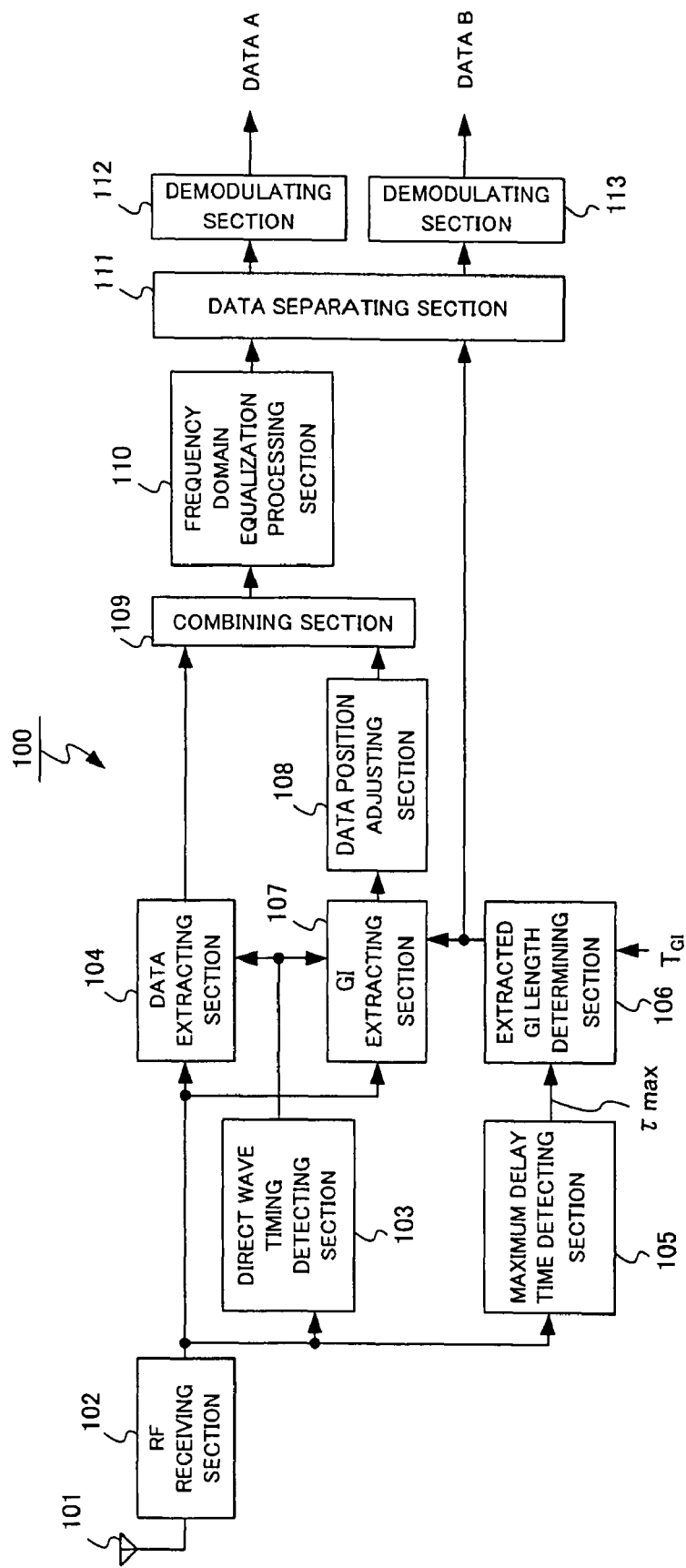
FIG. 3 is a block diagram showing a configuration of the receiving apparatus, according to Embodiment 1 of the present invention.

FIG. 3 is a block diagram showing a configuration of receiving apparatus 100 according to Embodiment 1 of the present invention. In the figure, RF receiving section 102 performs predetermined radio receiving processing such as down-conversion and A/D conversion for a signal received via antenna 101, and outputs the processed signal to direct wave timing detecting section 103, data extracting section 104, maximum delay time detecting section 105 and GI extracting section 107.

Figure 4:
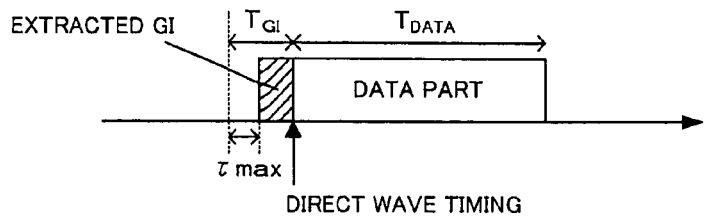
FIG. 4 shows data received by the receiving apparatus shown in FIG. 3.

Direct wave timing detecting section 103 detects the timing of the beginning of the data part of the direct wave (the direct wave timing) from the signal outputted from RF receiving section 102 as shown in FIG. 4, and outputs the detected timing to data extracting section 104 and GI extracting section 107.

Based on the timing outputted from direct wave timing detecting section 103, data extracting section 104 extracts the signal having a length of $T_{DATA}$ from the beginning of the data part of the direct wave of the signal outputted from RF receiving section 102, and outputs the extracted signal to combining section 109.

Maximum delay time detecting section 105 detects the maximum time of the delayed wave (the maximum delay time τmax) from the signal outputted from RF receiving section 102, and outputs the detected maximum delay time τmax to extracted GI length determining section 106.

Extracted GI length determining section 106 obtains $T_{GI}$, which indicates the length of the GI in the received data, and outputs the length given by subtracting the maximum delay time τmax from the obtained $T_{GI}$, to GI extracting section 107 and data separating section 111.

GI extracting section 107 extracts the GI having the length given by extracted GI length determining section 106, and outputs the extracted GI (hereinafter referred to as "extracted GI") to data position adjusting section 108. Data position adjusting section 108 adjusts the rear end of the extracted GI outputted from GI extracting section 107 to the rear end of the data part, and outputs the extracted GI after the data position adjustment, to combining section 109.

Combining section 109 combines the data part outputted from data extracting section 104 and the extracted GI outputted from data position adjusting section 108, and outputs the combined signal to frequency domain equalization processing section 110. Frequency domain equalization processing section 110 corrects the distortion of the signal outputted from combining section 109 by correcting the distortion of the signal in the frequency domain, and outputs the corrected signal to data separating section 111.

Data separating section 111 separates the signal outputted from frequency domain equalization processing section 110 at the position going back the length of the extracted GI determined at the extracted GI length determining section 106 from the rear end of the data part, That is, data separating section 111 separates the part of the data part combined with the extracted GI. The part including the beginning of the data part, not combined with the extracted GI, is outputted to demodulating section 112. The part including the rear end of the data part, combined with the extracted GI, is outputted to demodulating section 113.

Demodulating sections 112 and 113 each demodulate the data outputted from data separating section 111. Demodulating section 112 outputs demodulated data A and demodulating section 113 outputs demodulated data B.

Figure 5:
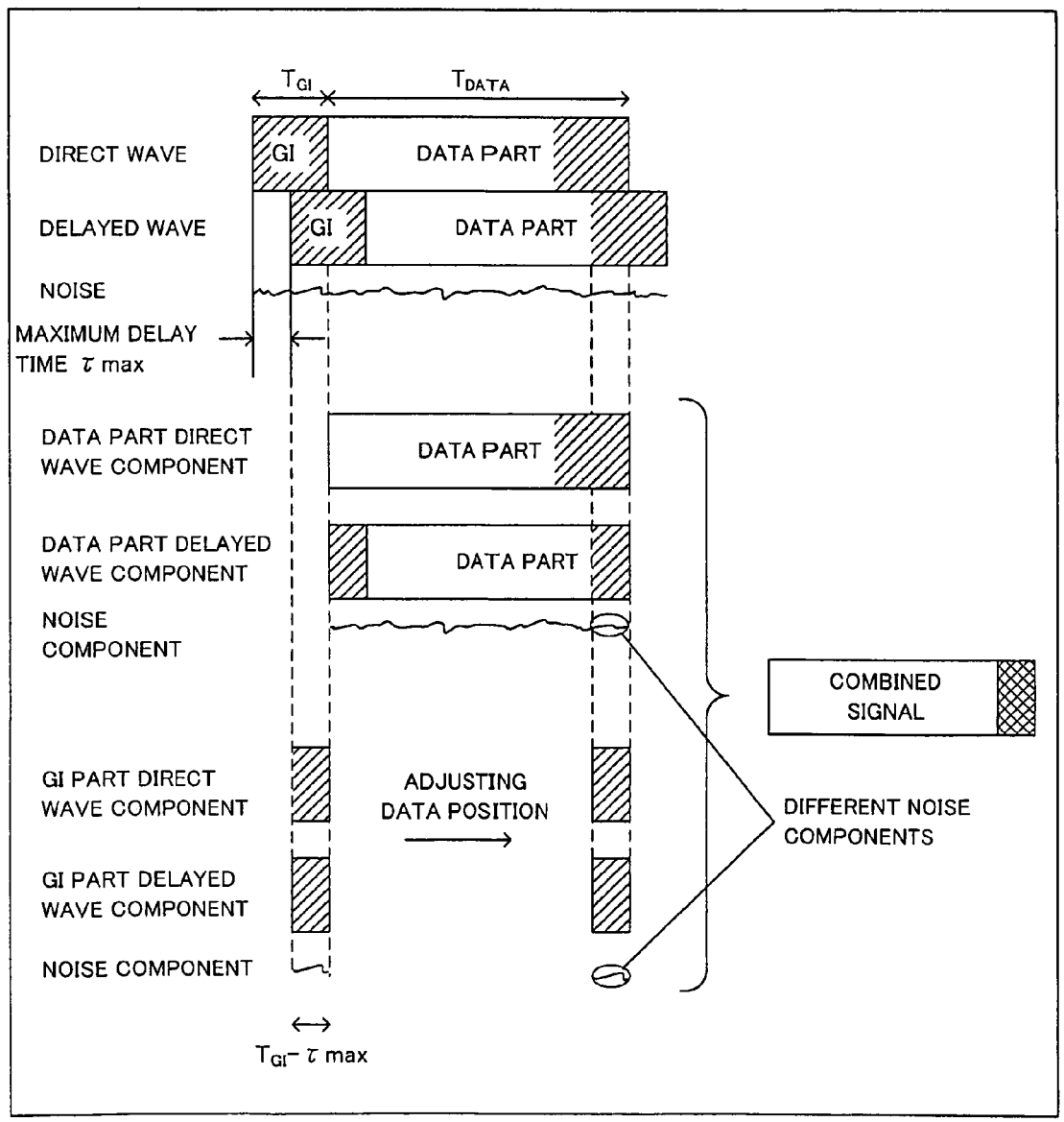
FIG. 5 explains receiving processing in the receiving apparatus shown in FIG. 3.

Next, the operations of receiving apparatus 100 having the above configurations will be explained with reference to FIG. 5. Data extracting section 104 extracts a portion occupying data part length $T_{DATA}$ from the beginning of the data part, from the received signal combing the direct wave component, the delayed wave component and the noise component in the receiving apparatus (hereinafter simply "noise component").

In addition, GI extracting section 107 extracts the GI part subtracting the maximum delay time τmax from the GI length $T_{GI}$. To be more specific, GI extracting section 107 extracts the part of the GI going back the length of the maximum delay time τmax from the beginning of the data part (rear end of the GI), that is, the part of the GI that is not interfered with the data of adjacent time.

Data position adjusting section 108 adjusts the data position of the extracted GI such that the rear end of the extracted GI and the rear end of the extracted data part match. Combining section 109 combines the extracted GI after the data position adjustment with the data part. This extracted GI and the rear end of the extracted data part extracted by data extracting section 104 are the same signal. To be more specific, the parts subjected to the combining have different noise components, and so combining these parts results in improved SNR (Signal to Noise Ratio) in the combined part. The signal combined in combining section 109 is subjected to signal distortion equalization in frequency domain equalization section 110. The SNR improves in the part combined with the extracted GI, so that error rate characteristics also improve.

According to Embodiment 1, demodulation can be performed through effective use of the energy of GIs, by extracting from the GI included in received data the part that is not interfered with the data of adjacent time and by combining the extracted GI with the rear end part of the data part. Consequently, according to Embodiment 1, the SNR of the combined part improves, so that errors decrease in the combined part.

Embodiment 2

In the case of multicarrier transmission such as the OFDM scheme, by combining GI parts, the SNR improves in part of the OFDM symbol in the time domain. However, when an OFDM symbol is converted from the time domain to the frequency domain, SNR improvement is distributed over all subcarriers constituting the OFDM symbol. As a result, although the SNR of each symbol that is mapped to the subcarriers improves equally, the degree of improvement is small.

On the other hand, in single carrier transmission like the present invention, symbols allocated in the time domain are transmitted by single carriers, so that, by combining GI parts, the SNR improves only in the symbols of GIs. Further, the SNR is expected to improve as much as about 3 dB.

With multicarrier transmission, the SNR of each symbol can be improved equally at low levels. On the other hand, in single carrier transmission like the present invention, the SNR can be improved in high levels only in part of the symbols deriving GIs.

The present embodiment will focus on such characteristics of GI parts in single carrier transmissions.

Figure 6:
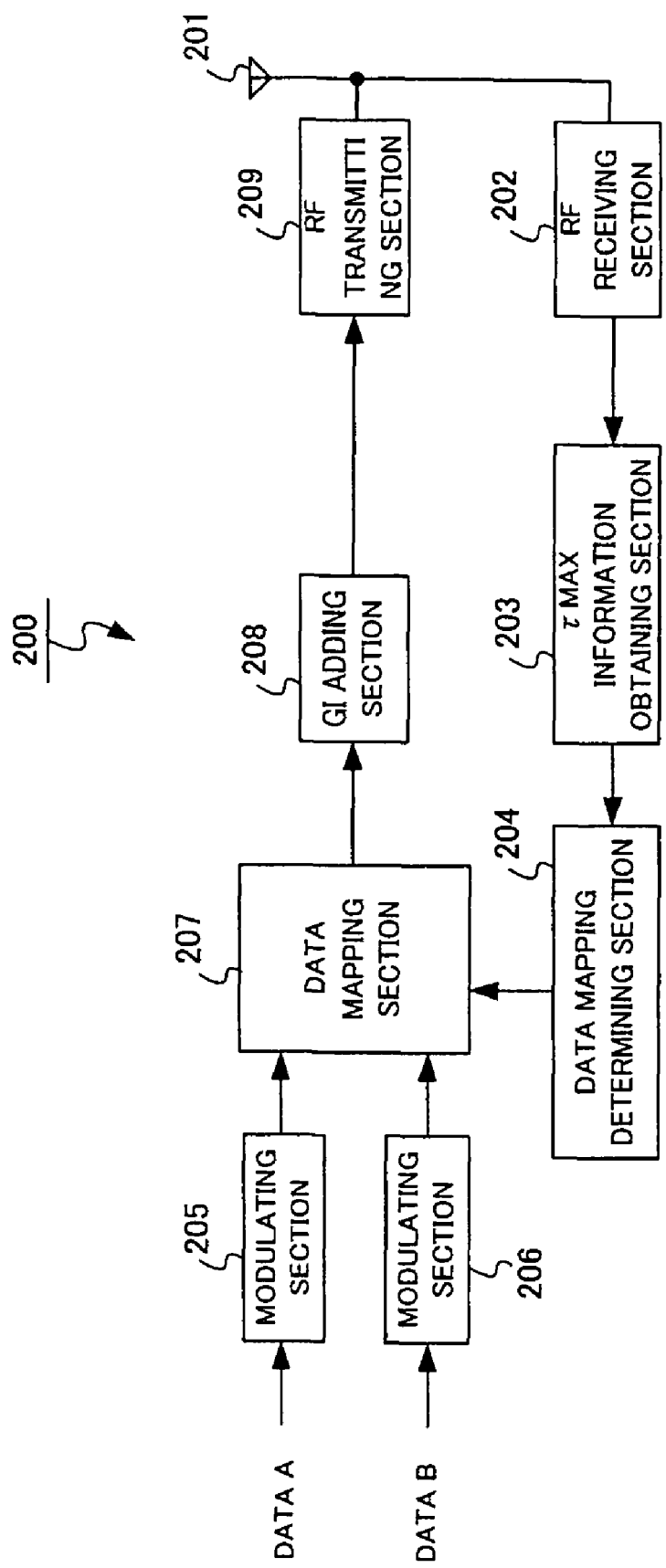
FIG. 6 is a block diagram showing a configuration of the transmitting apparatus, according to Embodiment 2 of the present invention.

FIG. 6 is a block diagram showing a configuration of transmitting apparatus 200, according to Embodiment 2 of the present invention. According to the figure, RF receiving section 202 performs predetermined radio receiving processing such as down-conversion and A/D conversion for a signal received via an antenna 201, and outputs the processed signal to τmax information obtaining section 203.

τmax information obtaining section 203 obtains τmax information indicating the maximum time of the delayed wave (the maximum delay time), and outputs the obtained τmax information to data mapping determining section 204.

Based on τmax information outputted from τmax information obtaining section 203, data mapping determining section 204 determines the data mapping method and reports the determined data mapping method to data mapping section 207. The data mapping method will be described later.

On the other hand, transmission data is separated into data A and B, and data A is inputted to modulating section 205 and data B is inputted to modulating section 206.

Modulating sections 205 and 206 each modulate the inputted data using modulation schemes such as PSK modulation or QAM modulation and output the modulated signal to data mapping section 207.

Data mapping section 207 maps the signals inputted from modulating sections 205 and 206 by the data mapping method determined by data mapping determining section 204, and outputs the mapped signal to GI adding section 208.

Figure 7:
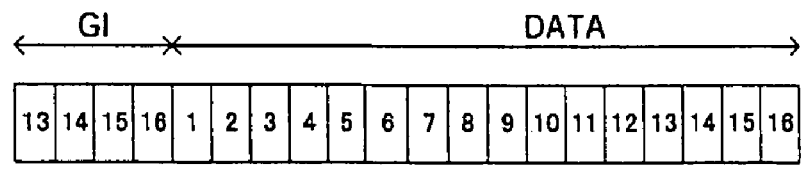
FIG. 7 explains a method of generating GI.

GI adding section 208 generates a GI by copying a predetermined portion from the rear end of the data part of the signal outputted from data mapping section 207, and outputs the signal in which the generated GI is attached to the beginning of the data part, to RF transmitting section 209. FIG. 7 shows a specific example of the method of generating GIs. According to the specific example shown in FIG. 7, the data part length is 16 symbols, and the GI length is 4 symbols. The symbols allocated in order from the beginning of the data part are distinguished as symbol number 1 to 16. Four symbols of a GI length from the rear end of the data part, that is, symbol number 13 to 16, are copied to generate a GI.

RF transmitting section 209 performs predetermined radio transmitting processing such as D/A conversion and up-conversion with the signal outputted from GI adding section 208, and transmits the processed signal via antenna 201.

Figure 8:
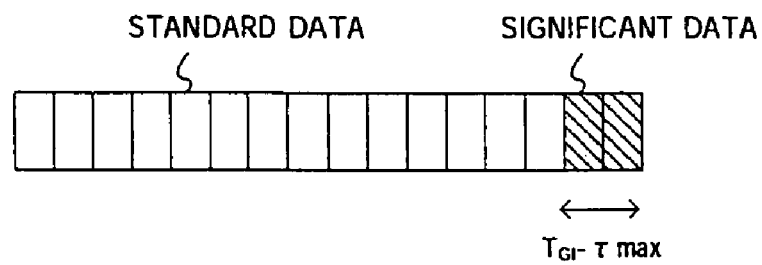
FIG. 8 is a transmission format showing a method of data mapping.

Here, the data mapping method in data mapping determining section 204 is explained. Data mapping determining section 204 obtains τmax information transmitted (fed back) from communicating parties. As shown in FIG. 8, data mapping determining section 204 maps significant information such as the control channel, systematic bits, retransmission bits, ACK/NACK information (ACK or NACK), CQI (Channel Quality Indicator), TFCI (Transport Format Combination Indicator), information required for decoding, pilot bits and power control bits, to the part occupying $T_{GI}$-τmax from the rear end of the data part, that is, the part where error rate characteristics improve in receiving apparatus 100 of Embodiment 1. According to this mapping method, significant information is correctly transmitted.

If transmitting apparatus 200 regards data A to be inputted to modulating section 205 as significant information and data B to be inputted to modulating section 206 as standard information other than significant information, data mapping section 207 maps data A to the part occupying $T_{GI}$-τmax from the rear end of the data part, and data B to the rest of the data part.

According to Embodiment 2, significant information can be transmitted to the receiving apparatus correctly, by finding the part where error rate characteristics improve based on τmax information and mapping the significant information to the part found out, so that overall system throughput improves.

Further, although a case has been described with the present embodiment where the FDD scheme is adopted and where τ max information is fed back from communication parties, the present invention is not limited to this, and it is equally possible to adopt the TDD scheme. If the present invention adopts the TDD scheme, it will be possible to measure τ max based on received signals. FDD and TDD do not limit the method of obtaining τ max.

Embodiment 3

In Embodiment 2, a data mapping method of performing data mapping based on τmax information has been described. Now, other data mapping methods will be described below. The data mapping method explained in Embodiment 2 is method A, and the methods B to E, which are different methods from method A, will be described below.

Figure 9:
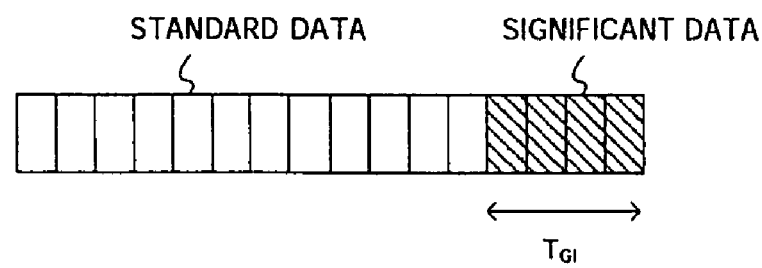
FIG. 9 is a transmission format showing a method of data mapping.

First, as shown in FIG. 9, method B maps significant information to the part occupying the GI length ($T_{GI}$) from the rear end of the data part. According to this method B, due to variations of τ max, not all significant information that is mapped will have improved error rate characteristics. Still, according to this method B, when τ max information is difficult to obtain or when installation of additional circuitry for obtaining τ max information is undesirable, error rate characteristics of significant information are more likely to improve.

Figure 10:
FIG. 10 is a transmission format showing a method of data mapping.

Next, as shown in FIG. 10, method C maps significant information, in the part occupying the GI length ($T_{GI}$) from the rear end of the data part, in descending order of significance from the rear end of the data part, because error rate characteristics are likely to improve nearer the rear end of the data part.

The reason will be explained below. τmax can vary varied between zero and $T_{GI}$. If τmax is zero, the error rate improves in the whole of the part occupying $T_{GI}$ from the rear end of the data part. Meanwhile, when τmax is $T_{GI}$, the error rate in the whole of the part occupying $T_{GI}$ from the rear end of the data part is the same error rate as the rest of the data part, error rate characteristics are not likely to improve.

In actual systems, τmax is between zero and $T_{GI}$, as shown in FIG. 8, and so, as τmax becomes smaller, there are more symbols, from the rear end of the data part, where error rate characteristics improve. Consequently, error rate characteristics are more likely to improve near the end of the data part and are less likely to improve far from the rear end of the data part.

Due to these reasons, according to method C, as information becomes significant, error rate characteristics are likely to improve.

Figure 11:
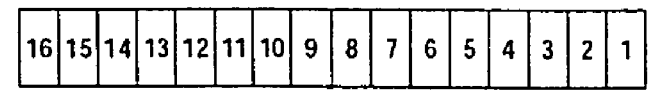
FIG. 11 is a transmission format showing a method of data mapping.

Next, as shown in FIG. 11, method D determines the significance of data and maps data from the rear end of the data part over the entirety of the data part in descending order of significance. According to method D, mapping process over the entirety of the data part can be performed at ease.

Figure 12:
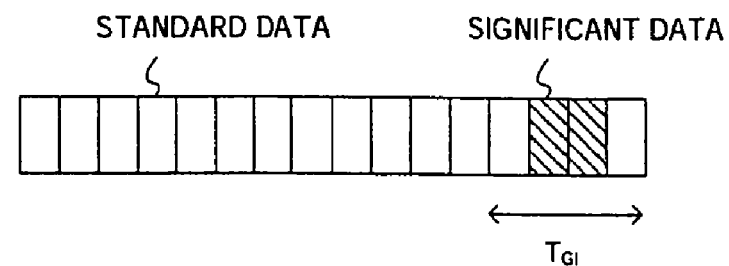
FIG. 12 is a transmission format showing a method of data mapping.

Next, as shown in FIG. 12, method E maps significant information to the part occupying the GI length ($T_{GI}$) from the rear end of the data part (that is, where the GI originates from)

excluding the symbols on both ends. In other words, method E maps significant information to a center portion of the part deriving the GI with priority and does not map information to both ends of that part. The reason is as follows.

In actual systems, the direct wave timing detected on the receiving apparatus side may be detected a little forward or backward with respect to the correct direct wave timing. In the case, in both ends of a GI, interference with the adjacent symbols occurs. That is, in actual systems, the SNR is less likely to improve in a little range at both ends of the part deriving the GI.

For this reason, according to method E, with more significant information, error rate characteristics are more likely to improve.

Further, according to method E, τmax information is not necessary, so that a τmax information obtaining section needs not be provided in the transmitting apparatus. The same applies to methods B to D.

Embodiment 4

Figure 13:
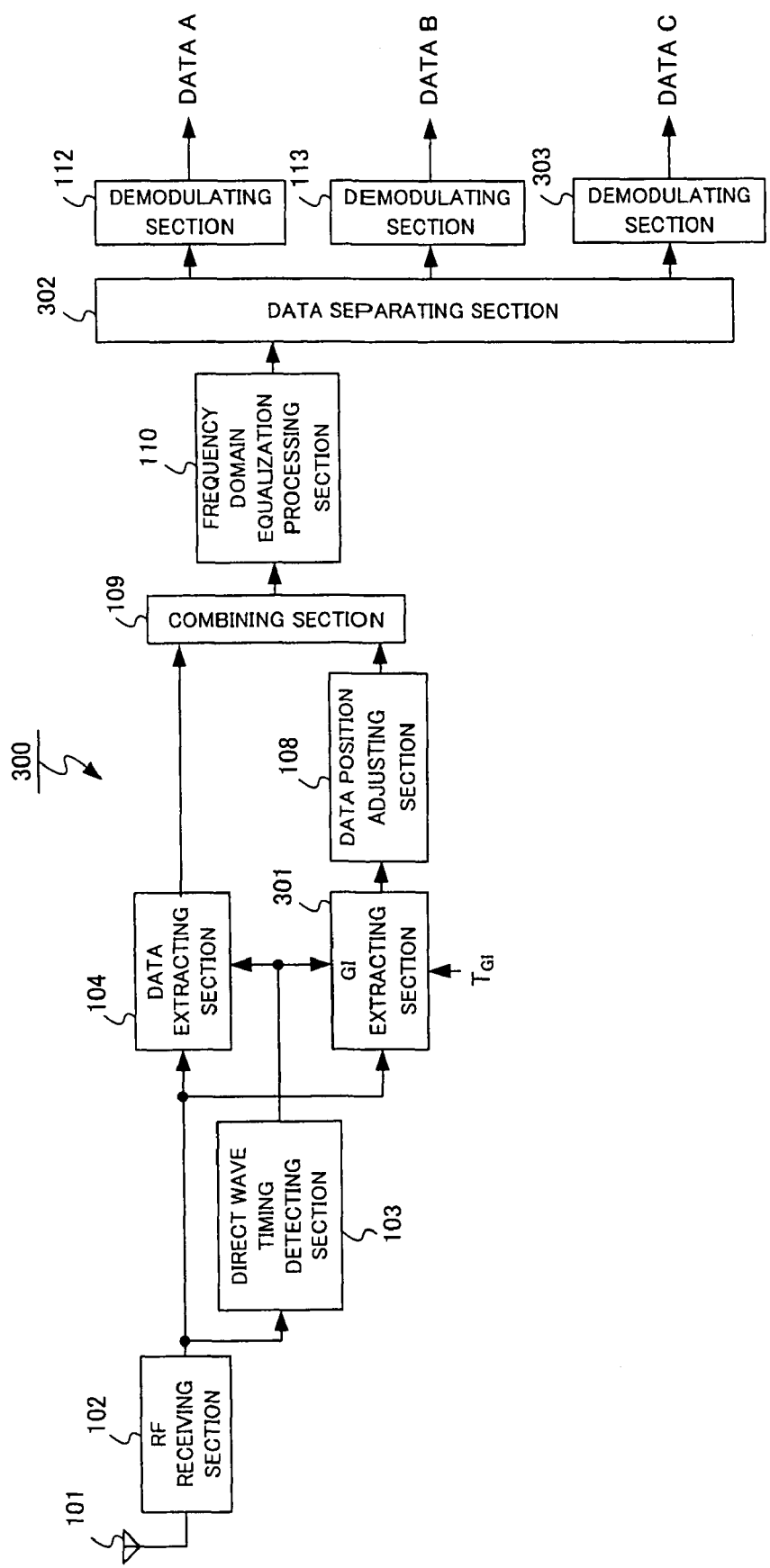
FIG. 13 is a block diagram showing a configuration of the receiving apparatus, according to Embodiment 4 of the present invention.

FIG. 13 is a block diagram showing a configuration of receiving apparatus 300, according to Embodiment 4 of the present invention. According to FIG. 13, the same components as those described in FIG. 3 will be assigned the same reference numerals and their detailed descriptions will be omitted. FIG. 13 is different from FIG. 3 in adding demodulating section 303, in changing GI extracting section 107 to GI extracting section 301 and data separating section 111 to data separating section 302, and in removing maximum delay time detecting section 105 and extracted GI length determining section 106.

GI extracting section 301 obtains $T_{GI}$ which indicates the length of the GI in received data, and extracts the entire GI (the whole from the beginning to the rear end of the GI) from the direct wave of the signal outputted from RF receiving section 102, based on the obtained $T_{GI}$ and the timing outputted from direct wave timing detecting section 103. The extracted GI is outputted to data position adjusting section 108.

Data separating section 302 separates the signal outputted from frequency domain equalization processing section 110 at the position going back $T_{GI}$ from the rear end of the data part and at the position going back two $T_{GI}$'s from the rear end of the data part. The part including the beginning of the data part, not combined with the extracted GI, is outputted to demodulating section 112. The part including the rear end of the data part, combined with the extracted GI, is outputted to demodulating section 113. The part between the position going back $T_{GI}$ from the rear end of the data part and the position going back two $T_{GI}$'s from the rear end of the data part is outputted to demodulating section 303.

Demodulating section 303 demodulates the data outputted from data separating section 302 and outputs data C.

Figure 14:
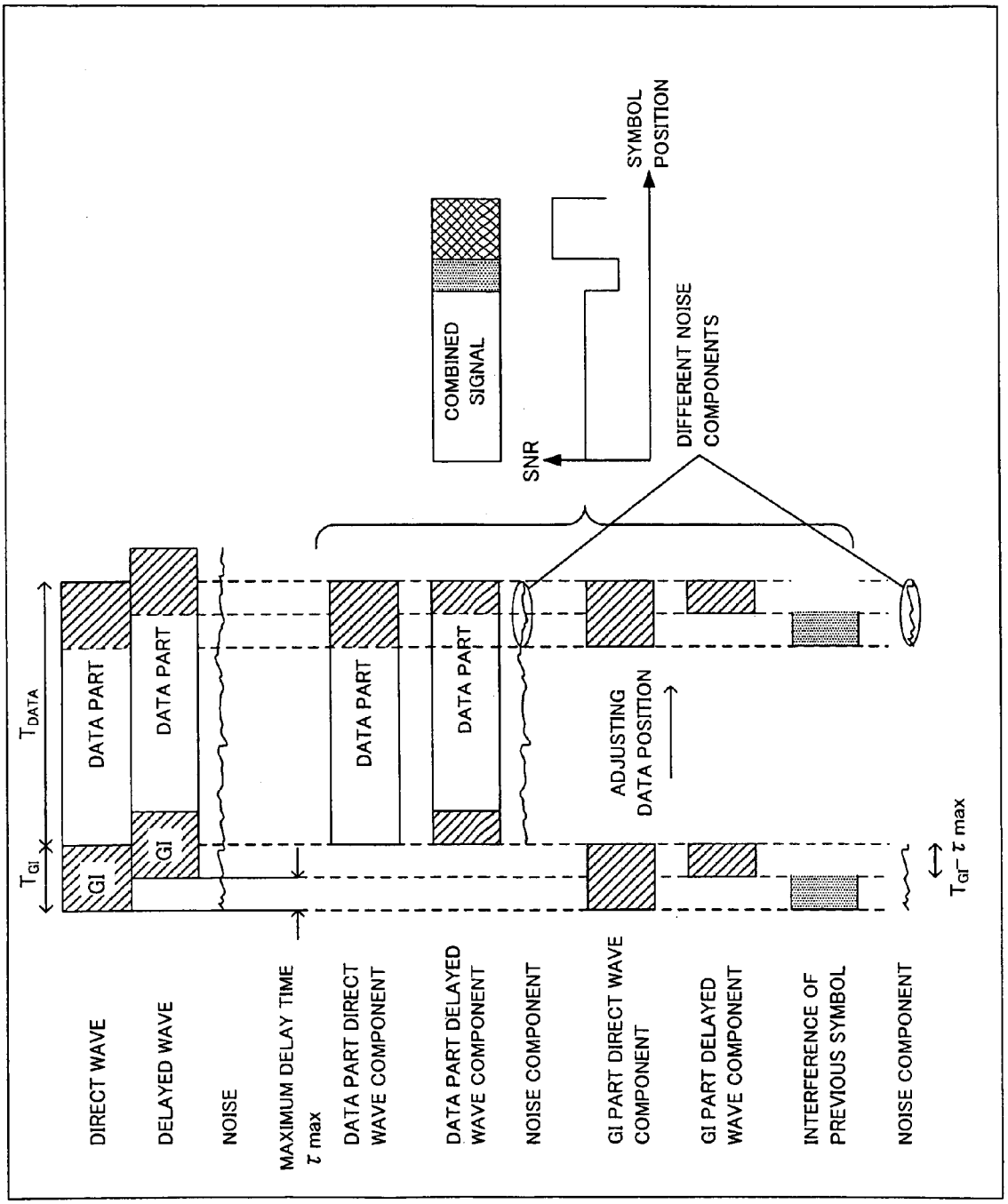
FIG. 14 explains receiving processing in a receiving apparatus shown in FIG. 3.

Next, the operations of receiving apparatus 300 having the above configuration will be explained with reference to FIG. 14. Data extracting section 104 extracts data occupying the data part length $T_{DATA}$ from the beginning of the data part of the direct wave, from the received signal combing the direct wave component, the delayed wave component and the noise component in the receiving apparatus. In addition, GI extracting section 301 extracts the GI of the direct wave. The extracted GI includes the GI of the direct wave, a portion of the GI of the delayed wave ($T_{GI}$-τmax), interference by the previous symbol (τmax) and the noise component.

Data position adjusting section 108 adjusts the data position of the extracted GI such that the rear end of the extracted GI and the rear end of the data part match. Combining section 109 combines the extracted GI after the data position adjustment with the data part.

The combined signal, combined as such, is the signal combining all energy of the GI of the direct wave, so that the SNR improves in the part where the extracted GI is combined. On the other hand, the part immediately preceding the part combined with the extracted GI includes interference from the previous symbol, and so the SNR of the immediately preceding part degrades. Here, the average SNR over the entirety from the beginning to the rear end of the data part improves reliably and so error rate characteristics improve.

Figure 15:
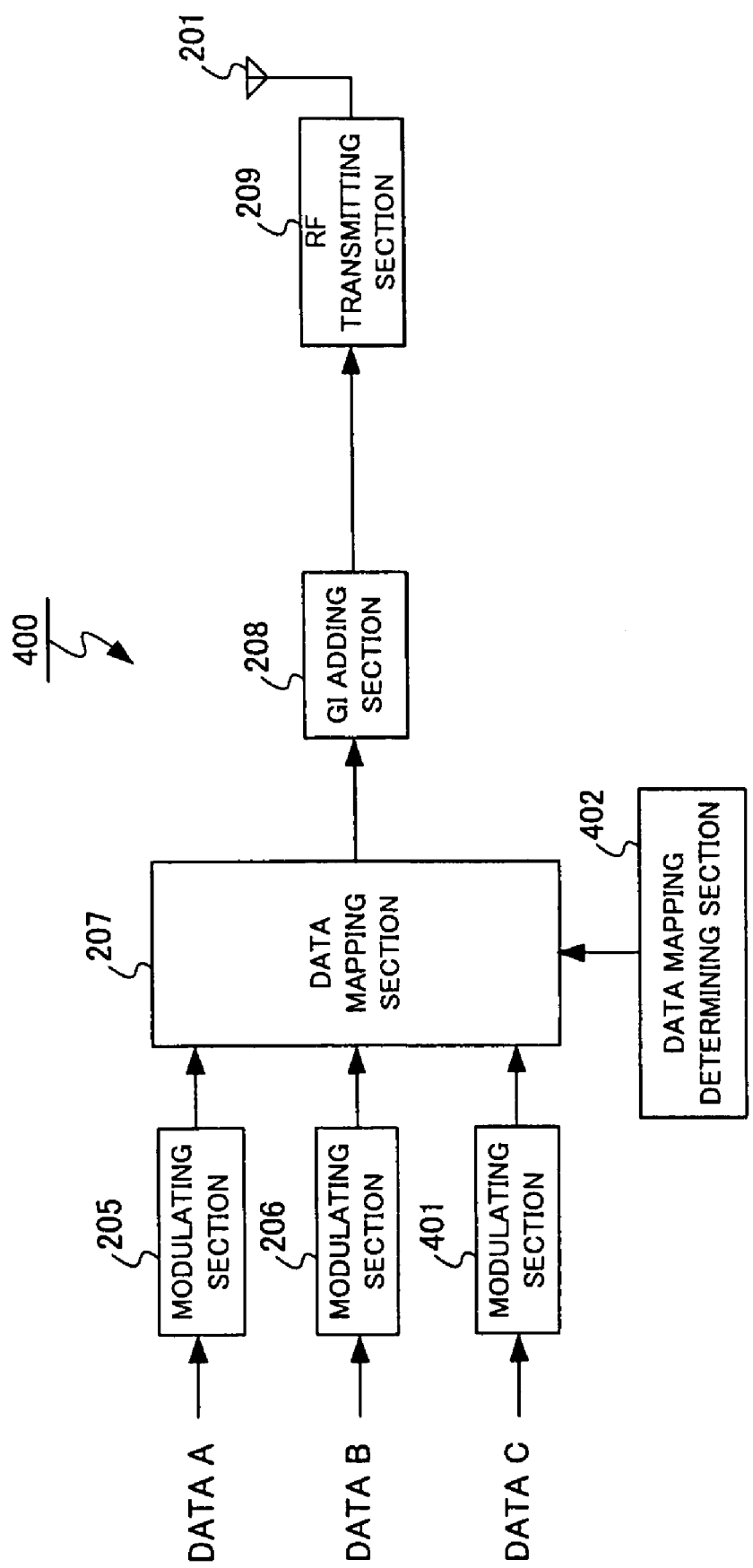
FIG. 15 is a block diagram showing a configuration of a transmitting apparatus, according to Embodiment 4 of the present invention.

FIG. 15 is a block diagram showing a configuration of transmitting apparatus 400, according to Embodiment 4 of the present invention. Further, according to FIG. 15, the same components as those described in FIG. 6 are assigned the same reference numerals and the details will be omitted. In comparison to FIG. 6, FIG. 15 adds modulating section 401, changes data mapping determining section 204 to 402, and removes RF receiving section 202 and τmax information obtaining section 203.

Modulating section 401 modulates inputted data C using modulation schemes such as PSK modulation and QAM modulation and outputs the modulated signal to data mapping section 207.

Data mapping determining section 402 determines the data mapping method and reports the determining data mapping method to data mapping section 207. Here, the data mapping method reported to data mapping section 207 will be explained using FIG. 16. The data mapping method, as shown in FIG. 16, maps significant information such as control channels, information required for decoding, systematic bits, pilot bits and power control bits and ACK/NACK information (ACK or NACK), to the part occupying $T_{GI}$ length from the rear end of the data part, that is, the part where error rate characteristics improve. Further, the data mapping method maps insignificant information such as parity bits and repeating bits to the part between the position going back $T_{GI}$ from the rear end of the data part and the position going back two $T_{GI}$'s from the rear end of the data part, that is, the part where error bit characteristics degrade. According to this method, significant information is transmitted correctly to the receiving apparatus and the transmission format can be utilized effectively by mapping insignificant information to the part where quality degrades.

Consequently, with transmitting apparatus 400, data A inputted to modulating section 205 is significant information, data C inputted to modulating section 401 is insignificant information, and data B inputted to modulating section 206 as the other, standard information. In other words, data mapping section 207 maps data A to the part occupying $T_{GI}$ from the rear end of the data part, data C to the part between the position going back $T_{GI}$ from the rear end of the data part and the position going back two $T_{GI}$'s from the rear end of the data part, and data B to the rest of the data part (before or at the position going back two $T_{GI}$'s from the rear end of the data part).

In addition, data mapping determining section 402 may also use the method shown in FIG. 17 in addition to the data mapping method described above. This method determines the significance of data and maps data in descending order of significance, from the part of good error rate characteristics. According to this method, information of great significance is transmitted reliably to the receiving apparatus.

According to Embodiment 4, the GI of the direct wave included in the received signal is extracted and the part of the extracted GI is combined with the rear end part of the data part before frequency domain equalization processing is performed, so that demodulation is performed through effective use of energy of the GI. As a result, the SNR improves in the combined part.

Embodiment 5

Cases have been described above with Embodiments 1 to 4 where a predetermined portion of the rear part of the data part is attached to the beginning of the data part as a GI. In contrast, according to Embodiment 5 of the present invention, a predetermined portion of the front part of the data part is attached to the rear end of the data part as a GI. Further, the components of the receiving apparatus according to Embodiment 5 of the present invention are the same as shown in FIG. 3 according to Embodiment 1, and this embodiment will be explained with reference to FIG. 3.

In FIG. 18, the receiving process according to the present embodiment is shown in a schematic manner. Data extracting section 104 extracts the part occupying data part length $T_{DATA}$ from the beginning of the data part of the direct wave, from the received signal combined with the direct wave component, the delayed wave component and the noise component in the receiving apparatus.

Further, GI extracting section 107 extracts the GI part going back $T_{GI}$-τmax from the rear end of the part of the GI of the direct wave. That is, GI extracting section 107 extracts the proportion of the GI that is not interfered with data of adjacent time.

Data position adjusting section 108 adjusts the position of the extracted GI such that the beginning of the extracted GI and the beginning of the extracted data part match. Combining section 109 combines the extracted GI after the data position adjustment with the data part.

Next, data mapping methods E to H according to the present embodiment will be explained. Further, the same transmitting apparatus components according to Embodiment 5 of the present invention are shown in FIG. 6 in Embodiment 2, and the details are omitted.

Figure 19:
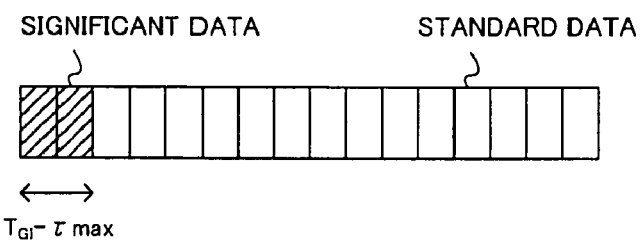
FIG. 19 is a transmission format showing a method of data mapping.

First, as shown in FIG. 19, method E, which corresponds to method A shown in FIG. 8, maps significant information to the part occupying $T_{GI}$-τmax from the beginning of the data part, that is, to the part where error rate characteristics improve.

Figure 20:
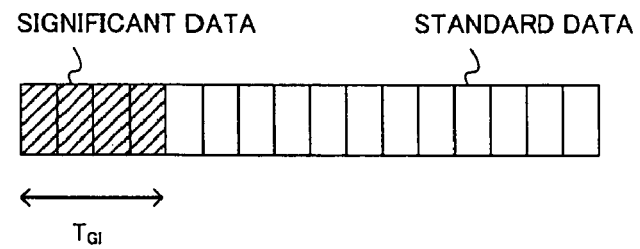
FIG. 20 is a transmission format showing a method of data mapping.

As shown in FIG. 20, method F, which corresponds to method B in FIG. 9, maps significant information to the part occupying the GI length ($T_{GI}$) from the beginning of the data part.

Figure 21:
FIG. 21 is a transmission format showing a method of data mapping.

As shown in FIG. 21, method G, which corresponds to method C in FIG. 10, maps significant information in descending order of significance, from the beginning of the data, to the part occupying the GI length ($T_{GI}$) from the beginning of the data part.

Figure 22:
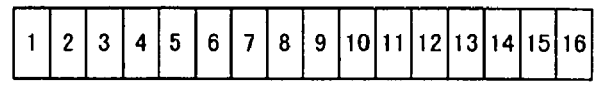
FIG. 22 is a transmission format showing a method of data mapping.

As shown in FIG. 22, method H, which corresponds to method D in FIG. 11, determines the significance of data, and maps data from the beginning of the data part, over the whole of the data part, in descending order of significance.

According to Embodiment 5, when a portion of the front part of the data part is added to the rear end of the data part as a GI, the energy of the GI can be utilized effectively for demodulation, so that the SNR of the combined part improves, thereby decreasing errors in the combined part. Further, significant information can be correctly transmitted to the receiving apparatus, so that overall system throughput improves.

Embodiment 6

A case has been described above with Embodiment 5 where a predetermined portion of the front part of the data part is added to the rear end of the data part as a GI and a portion of the GI is combined with the data part. On the other hand, a case will be described here with this Embodiment 6 where a predetermined portion of the front part of the data part is added to the rear end of the data part as a GI and the whole of the GI (from the beginning to the rear end of the GI) is combined with the data part, employing mapping method I and J. Further, the same transmitting apparatus components according to Embodiment 6 of the present invention are shown in FIG. 15 in Embodiment 4, and the details are omitted.

Figure 23:
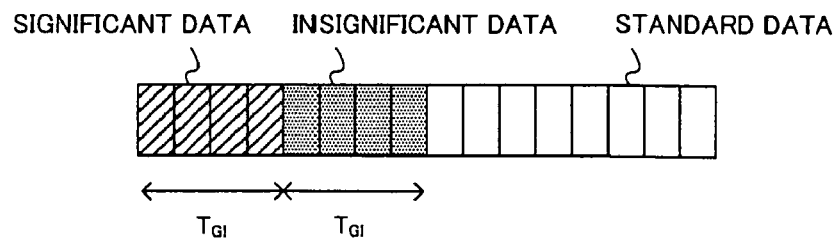
FIG. 23 is a transmission format showing a method of data mapping.

As shown in FIG. 23, corresponds to the method shown in FIG. 16. Method I maps significant information to the part occupying $T_{GI}$ from the beginning of the data part, maps insignificant information to the part between the position going back $T_{GI}$ from the beginning of the data part and the position going back two $T_{GI}$'s from the beginning of the data part, and maps standard information to the rest of the data part (at or after the position two $T_{GI}$'s after the beginning of the data part).

Figure 24:
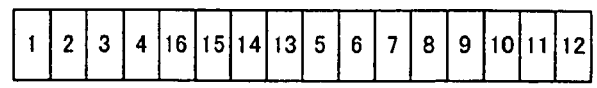
FIG. 24 is a transmission format showing a method of data mapping.

As shown in FIG. 24, method J, which corresponds to the method shown in FIG. 17, determines significance of data and maps data from the part where is most preferable error rate characteristics, in descending order of significance.

According to Embodiment 6, when a predetermined portion of the front part of the data part is added to the rear end of the data part as a GI and the GI and the data part are combined, significant information can be transmitted correctly to the receiving apparatus. Thus, overall system throughput improves.

Further, "standard information" according to the above embodiments includes, for example, data channels such as HS-DSCH, DSCH, DPDCH, DCH, S-CCPCH and FACH in 3GPP standards.

Furthermore, "significant information" according to the above embodiments includes, for example in 3GPP standards, HS-SCCH associated with HS-DSCH, DCCH S-CCPCH, P-CCPCH, and PCH for reporting control information for HS-DPCCH and RRM (Radio Resource Management), and, DPCCH for controlling a BCH physical channel.

In addition, "significant information" according to the above embodiments includes TFCI. TFCI is information for reporting data formats, and so, if TFCI is received incorrectly, the data of the whole frame or all subcarriers will be received incorrectly. Accordingly, it is effective to process TFCI as significant information in the above embodiments and improve error rate characteristics of TFCI.

Further, if control channels are roughly classified into the common control channel and the dedicated control channel, the common control channel may be processed as significant information in the above embodiments and the dedicated control channel may be processed as standard information in the above embodiments. The common control channel is commonly transmitted to a plurality of mobile stations and so requires better error rate characteristics than the dedicated control channel that is transmitted individually to each mobile station.

Further, the significant information in the above embodiments include initialization information (initialization vector) used in information compression or data encryption. This initialization vector is provides a base for later communications, and so, if the initialization vector is received incorrectly, a series of communications later may be not be possible at all. Accordingly, it is effective to process initialization vector as significant information in the above embodiments and improve error rate characteristics of the initialization vector.

Further, significant information in the above embodiments may include data of the center channel in multiplex transmission signals. For multiplex transmission signals, errors with the data of the center channel have more degradative influence in audibility than errors with other channels (the right, left or rear channel).

For example, although with the above embodiments cases have been described where the present invention is configured by hardware, the present invention may be implemented by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC", "system LSI", "super LSI", or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The present application is based on Japanese Patent Application No. 2005-066813, filed on Mar. 10, 2005, Japanese Patent Application No. 2005-212671, filed on Jul. 22, 2005, and Japanese Patent Application No. 2006-063972, filed on Mar. 9, 2006, the entire contents of which are expressly incorporated by reference herein.

INDUSTRIAL APPLICABILITY

The radio receiving apparatus and the radio transmitting apparatus according to the present invention carry out demodulation utilizing GIs effectively and improve received quality and may be applied to base station apparatus and mobile station apparatus used in a frequency equalization single-carrier transmission system.

The invention claimed is:

1. A radio transmitting apparatus that is configured to transmit, in a single carrier transmission system, a plurality of data symbols that are included in a data part and arranged between a front end and a rear end of the data part, the radio transmitting apparatus comprising:
   an arranging section that is configured to arrange the plurality of data symbols to map at least one data symbol including ACK/NACK information from the rear end of the data part; and
   a transmitting section that is configured to transmit, during a cyclic prefix period, one or more data symbols including data that is the same as data included in a portion of the plurality of data symbols, the portion ranging from the rear end of the data part and corresponding to the cyclic prefix period to thereby contain said at least one data symbol including ACK/NACK information, the transmitting section being further configured to transmit the plurality of data symbols in the data part after the cyclic prefix period;
   to thereby transmit, during the cyclic prefix period, said one or more data symbols including data that is the same as data included in the portion containing said at least one data symbol including ACK/NACK information, and to transmit, during transmission of the portion, said at least one data symbol including ACK/NACK information, such that ACK/NACK information is transmitted twice by the radio transmitting apparatus within a combination including a data part and a cyclic prefix period that precedes the data part.

2. A radio transmitting method for transmitting, in a single carrier transmission system, a plurality of data symbols that are included in a data part and arranged between a front end and a rear end of the data part, the radio transmitting method comprising:
   arranging the plurality of data symbols to map at least one data symbol including ACK/NACK information from the rear end of the data part;
   transmitting by a transmitter, during a cyclic prefix period, one or more data symbols including data that is the same as data included in a portion of the plurality of data symbols, the portion ranging from the rear end of the data part and corresponding to the cyclic prefix period to thereby contain said at least one data symbol including ACK/NACK information; and
   transmitting by the transmitter the plurality of data symbols in the data part after the cyclic prefix period,
   to thereby transmit, during the cyclic prefix period, said one or more data symbols including data that is the same as data included in the portion containing said at least one data symbol including ACK/NACK information, and to transmit, during transmission of the portion, said at least one data symbol including ACK/NACK information, such that ACK/NACK information is transmitted twice by the transmitter within a combination including a data part and a cyclic prefix period that precedes the data part.

* * * * *